United States Patent
Bonny

(10) Patent No.: US 11,125,328 B1
(45) Date of Patent: Sep. 21, 2021

(54) ELECTRIC ACTUATOR FOR USE ON A HYDRAULIC DRIVE DEVICE

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 17/000,840

(22) Filed: Aug. 24, 2020

Related U.S. Application Data

(63) Continuation of application No. 15/782,313, filed on Oct. 12, 2017, now Pat. No. 10,753,470.

(60) Provisional application No. 62/407,839, filed on Oct. 13, 2016.

(51) Int. Cl.
*F16H 61/435* (2010.01)
*F16H 35/10* (2006.01)
*F16D 33/18* (2006.01)
*F16C 17/10* (2006.01)

(52) U.S. Cl.
CPC ........... *F16H 61/435* (2013.01); *F16C 17/10* (2013.01); *F16D 33/18* (2013.01); *F16H 35/10* (2013.01)

(58) Field of Classification Search
CPC ...... F16H 61/435; F16H 61/437; F16H 35/10; F16D 33/18; F16C 17/10
See application file for complete search history.

(56) References Cited

U.S. PATENT DOCUMENTS 7,003,950 B1 * 2/2006 Holder .................... F16H 61/42
60/487

* cited by examiner

*Primary Examiner* — Dustin T Nguyen
*Assistant Examiner* — Daniel S Collins
(74) *Attorney, Agent, or Firm* — Neal, Gerber & Eisenberg LLP

(57) ABSTRACT

An electric actuator assembly for controlling the output of a variable output drive device such as a hydraulic transaxle or pump having an output shaft connected to a swash plate for rotation thereof to control the output of the drive device. The output shaft is engaged to and driven by a control shaft of an electric actuator. The assembly includes a clamping coupler to connect and align the output shaft and the control shaft, thereby permitting use of the electric actuator with multiple drive device designs without the need to modify the control shaft of the drive device.

20 Claims, 8 Drawing Sheets

ELECTRIC ACTUATOR FOR USE ON A HYDRAULIC DRIVE DEVICE

CROSS REFERENCE

The present application is a continuation of U.S. patent application Ser. No. 15/782,313, filed on Oct. 12, 2017, which claims priority to U.S. Prov. Pat. App. No. 62/407,839, filed on Oct. 13, 2016. The disclosures of these prior applications are incorporated by reference herein in their entirety.

BACKGROUND OF THE INVENTION

This application relates to an improved electric actuator for a drive apparatus generally, and in particular to an electric actuator for a drive apparatus having a rotatable control shaft, the combination intended for use in a vehicle or other mobile power equipment.

SUMMARY OF THE INVENTION

An electric actuator for use with a drive apparatus is disclosed herein. The electric actuator has a rotary design incorporating a position sensor disposed to engage an end of an output shaft of the actuator. An electric motor drives a reduction gear train to position the output shaft, the reduction gear train having a worm drive that motivates a spur gear reduction. Such electric actuators are capable of making precise control adjustments to a variable output hydraulic drive device, but the prior art actuators have required modifications to the control shafts of the drive devices to mate with the actuator. The present design provides an adaptor so that the actuator can be used with multiple existing hydraulic drive devices without the need to modify the internal or external structure of the drive device, thereby decreasing costs and increasing ease of installation.

The foregoing summary is exemplary of the description only, and a better understanding of the objects, advantages, features, properties and relationships of the inventions will be obtained from the following detailed description and accompanying drawings which set forth illustrative embodiments that are indicative of the various ways in which the principles of the inventions may be employed.

DETAILED DESCRIPTION OF THE DRAWINGS

Figure 1:
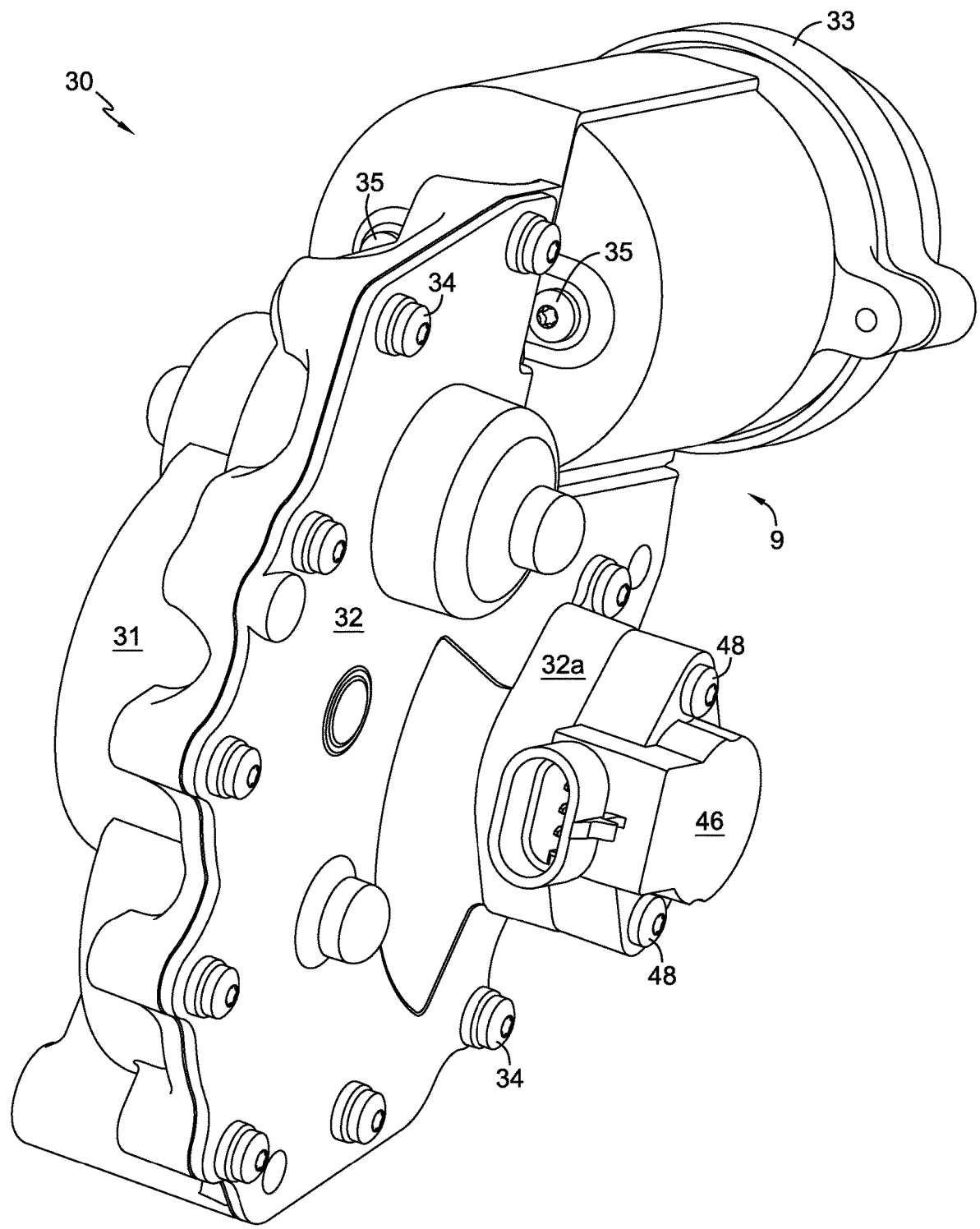
FIG. 1 is a perspective view of a prior art electric actuator.

The description that follows describes, illustrates and exemplifies one or more embodiments of the invention in accordance with its principles. This description is not provided to limit the inventions to the embodiment(s) described herein, but rather to explain and teach the principles of the inventions in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers using different prefixes in cases where such labeling facilitates a more clear description or understanding. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 2:
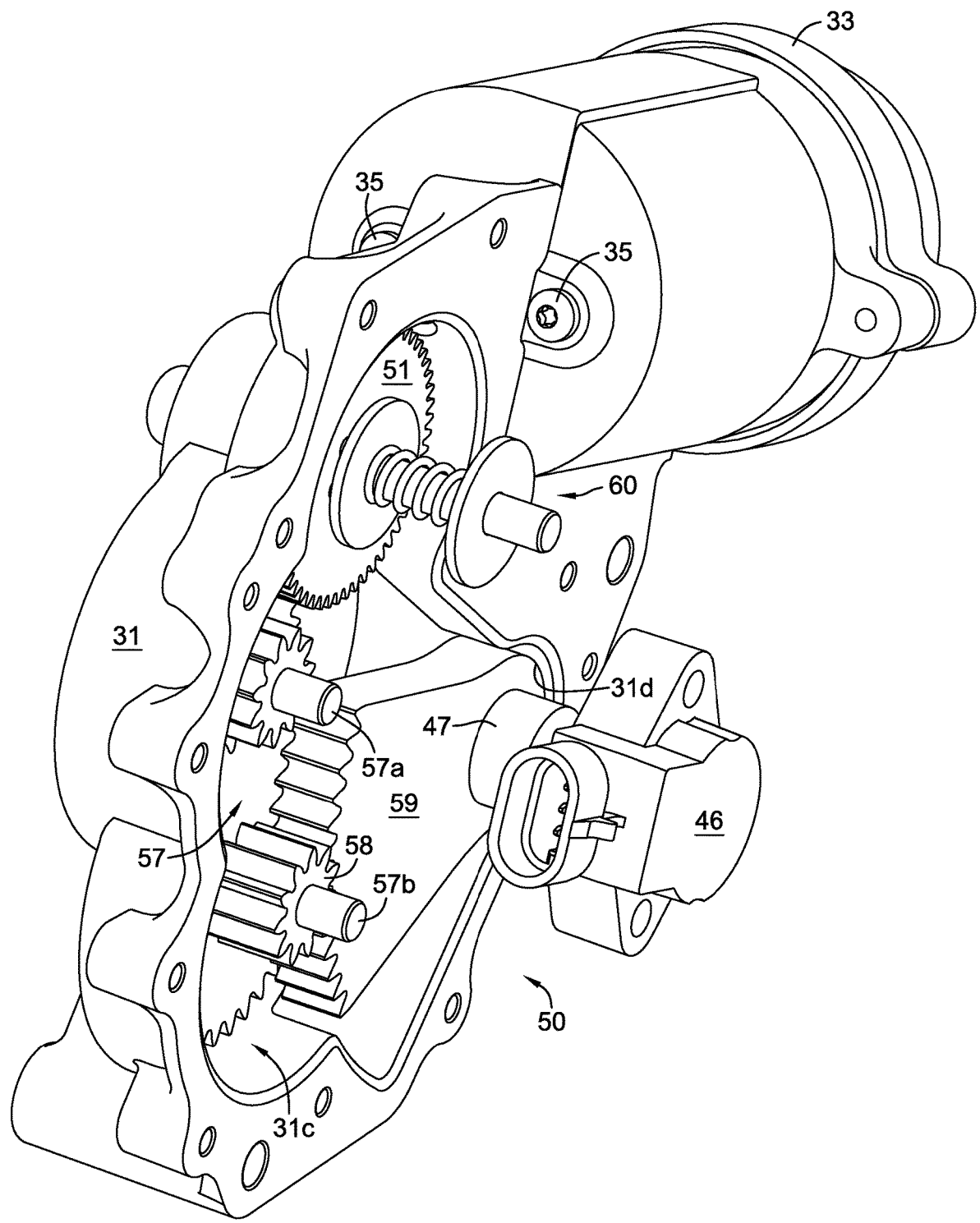
FIG. 2 is a perspective view of the prior art electric actuator shown in FIG. 1, with a housing element removed for clarity.

FIGS. 1 and 2 depict a prior art electric actuator 30, as disclosed in commonly-owned U.S. Pat. No. 9,114,798, the disclosure of which is incorporated by reference herein. Actuator 30 may be operatively secured to a drive apparatus such as a variable displacement pump, and is shown as a sealed unit having a housing 9 comprising a side housing 32 secured to a main housing 31 by fasteners 34. A liquid sealant material or other means known in the art may be used to seal the housings. Main housing 31 is divided into a motor chamber (not shown) and a gear chamber 31c. The motor chamber is sized to accommodate an internal electric motor (not shown) and is sealed by a cap 33. Gear chamber 31c is sized to accommodate worm gear 51, reduction gear train 50 and a slip clutch 60. The reduction gear train 50 and slip clutch 60 are greased assemblies enclosed in gear chamber 31c by the side housing 32. Reduction gear train 50 is constructed of a worm drive including worm gear 51 engaged to a spur gear reduction 57 of several stages that terminates with a sector gear 59 adapted to receive the control shaft of a drive apparatus, e.g. a trunnion arm. Jack shafts 57a and 57b are also provided for mounting of the spur gears. To aid such engagement, sector gear 59 is retained and aligned by a pocket 31d formed in the sidewall of gear chamber 31c, assisted by its mesh with drive gear 58. Slip clutch 60 is disposed between the worm drive and spur gear reduction 57. A position sensor 46 using adaptor 47 may be used on actuator 30; in the prior art depicted, adaptor 47 is mounted on a control shaft (not shown) of the drive apparatus.

Figure 3:
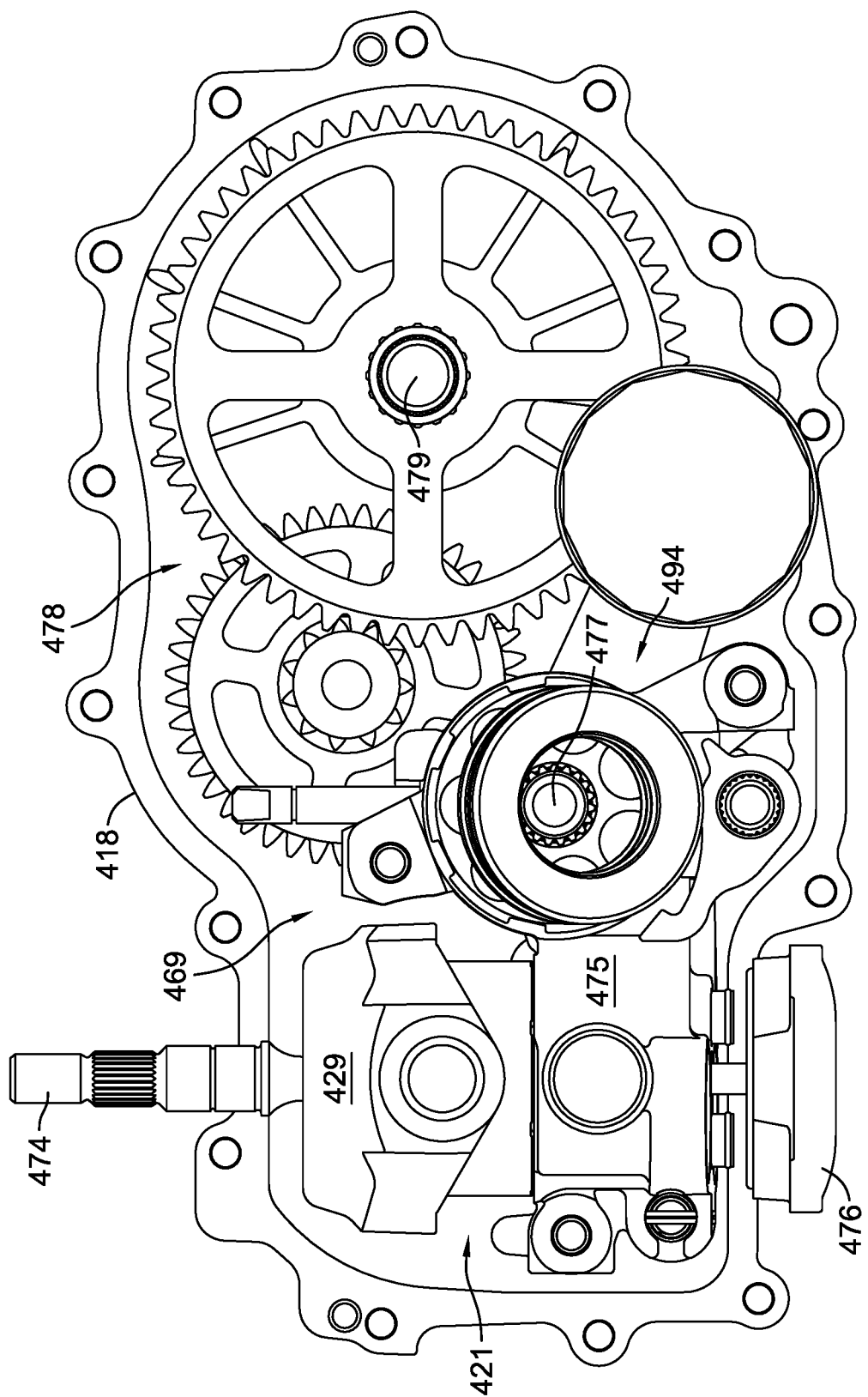
FIG. 3 is an interior elevational view of an exemplary transaxle for use with the actuator disclosed herein, with the main housing component removed to show the interior components of the transaxle.

FIG. 3 shows the internal structure of an exemplary prior art transaxle including hydraulic pump 421 rotatably disposed on center section 475 in main sump chamber 469 and controlled by a control mechanism, which in this embodiment is a hydraulic swash plate 429 similar to those shown in commonly-owned U.S. Pat. Nos. 7,134,276; 6,122,996 and 6,775,976, the disclosures of which are incorporated by reference herein. Hydraulic motor 494 is similarly disposed in main sump chamber 469 and drives motor output shaft 477, which in turn powers reduction gear train 478 to provide motive force to output axle 479. Pump input shaft 474 provides motive force to pump 421 and may also drive an optional charge pump 476.

Figure 4:
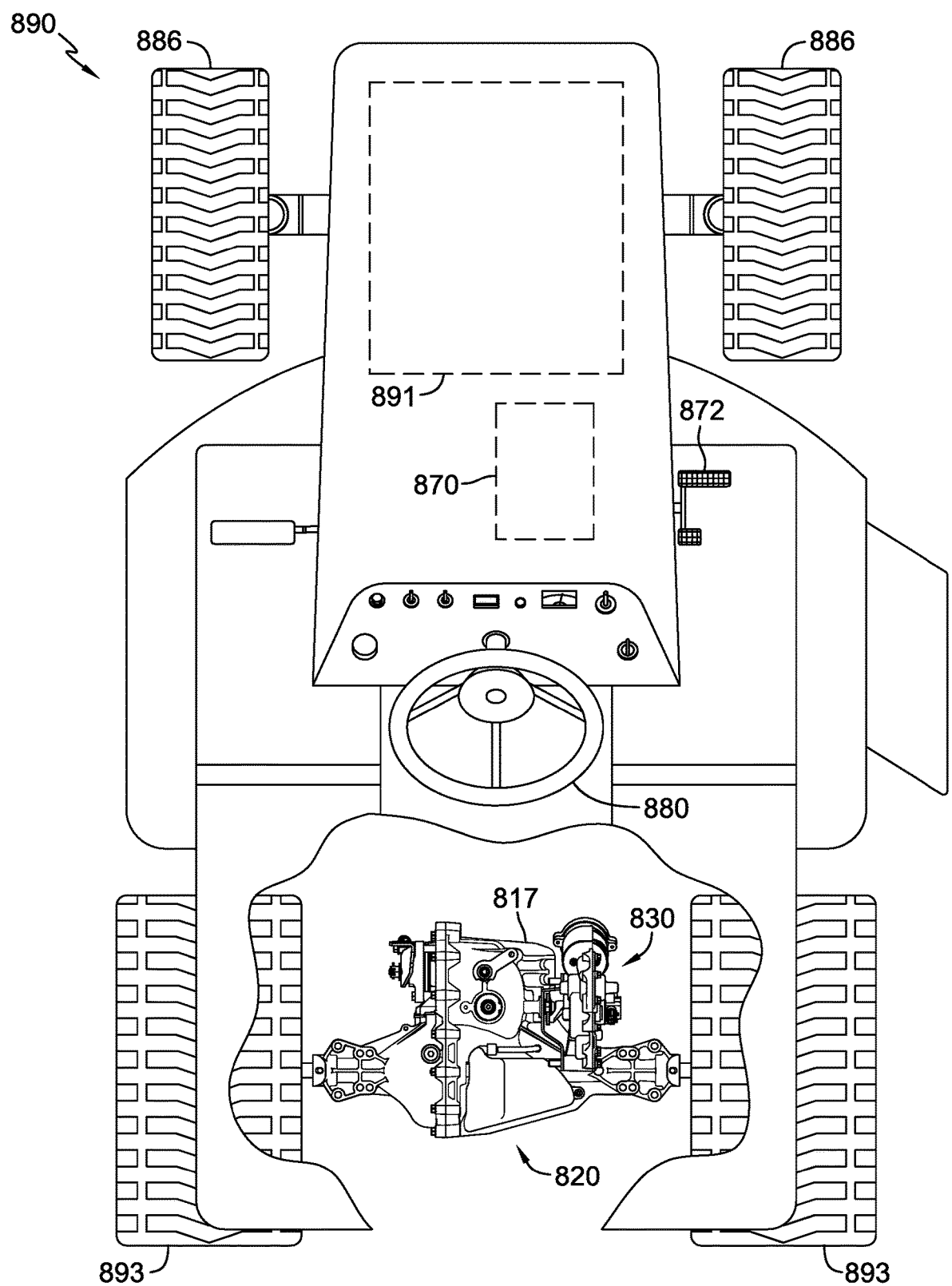
FIG. 4 is a partially schematic representation of a vehicle equipped with a hydraulic drive system utilizing a hydrostatic transaxle assembly including an electric actuator in accordance with the teachings herein.
Figure 5:
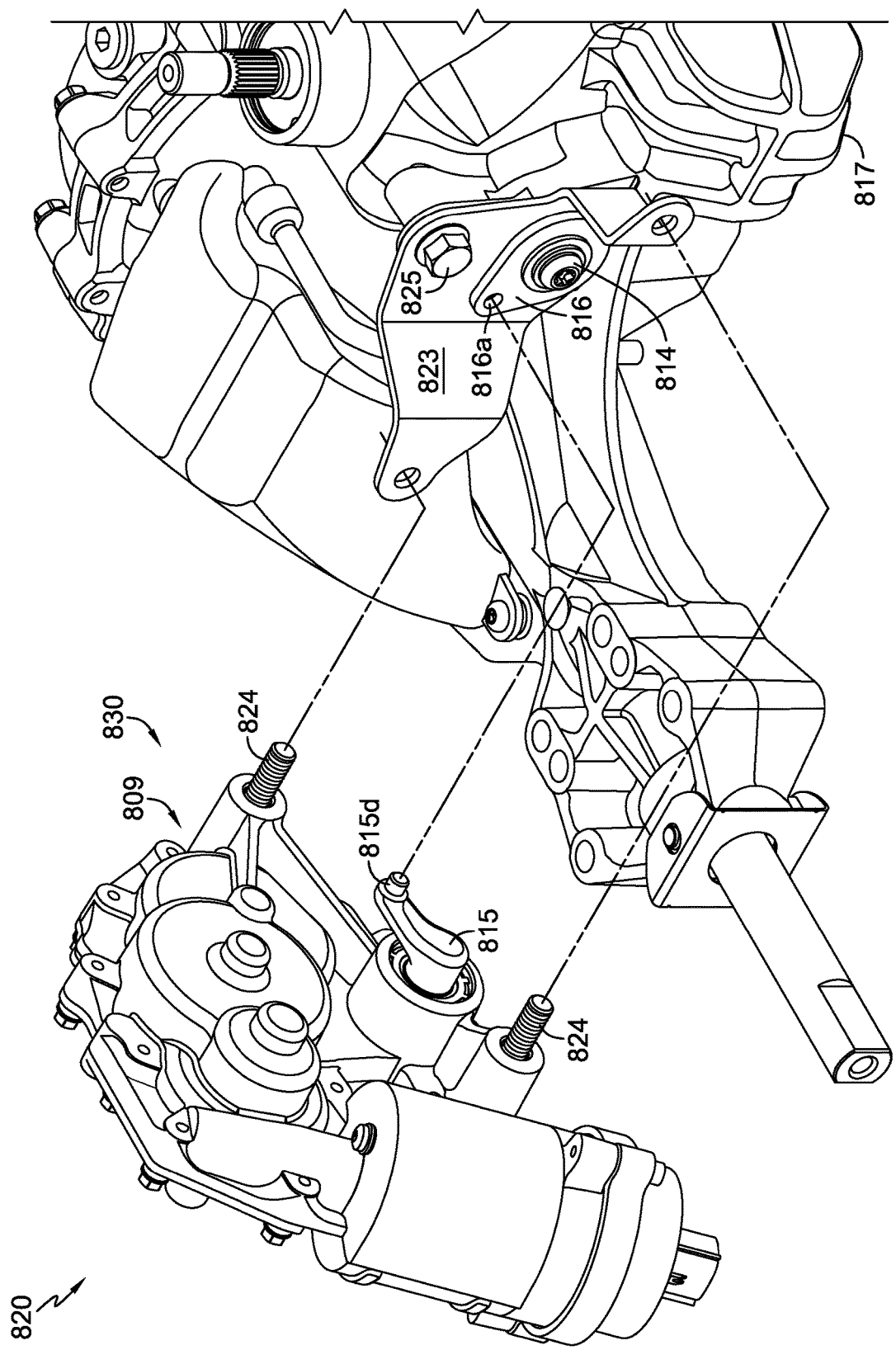
FIG. 5 is a partially exploded perspective view of a portion of the transaxle assembly and the electric actuator shown in FIG. 4.
Figure 6:
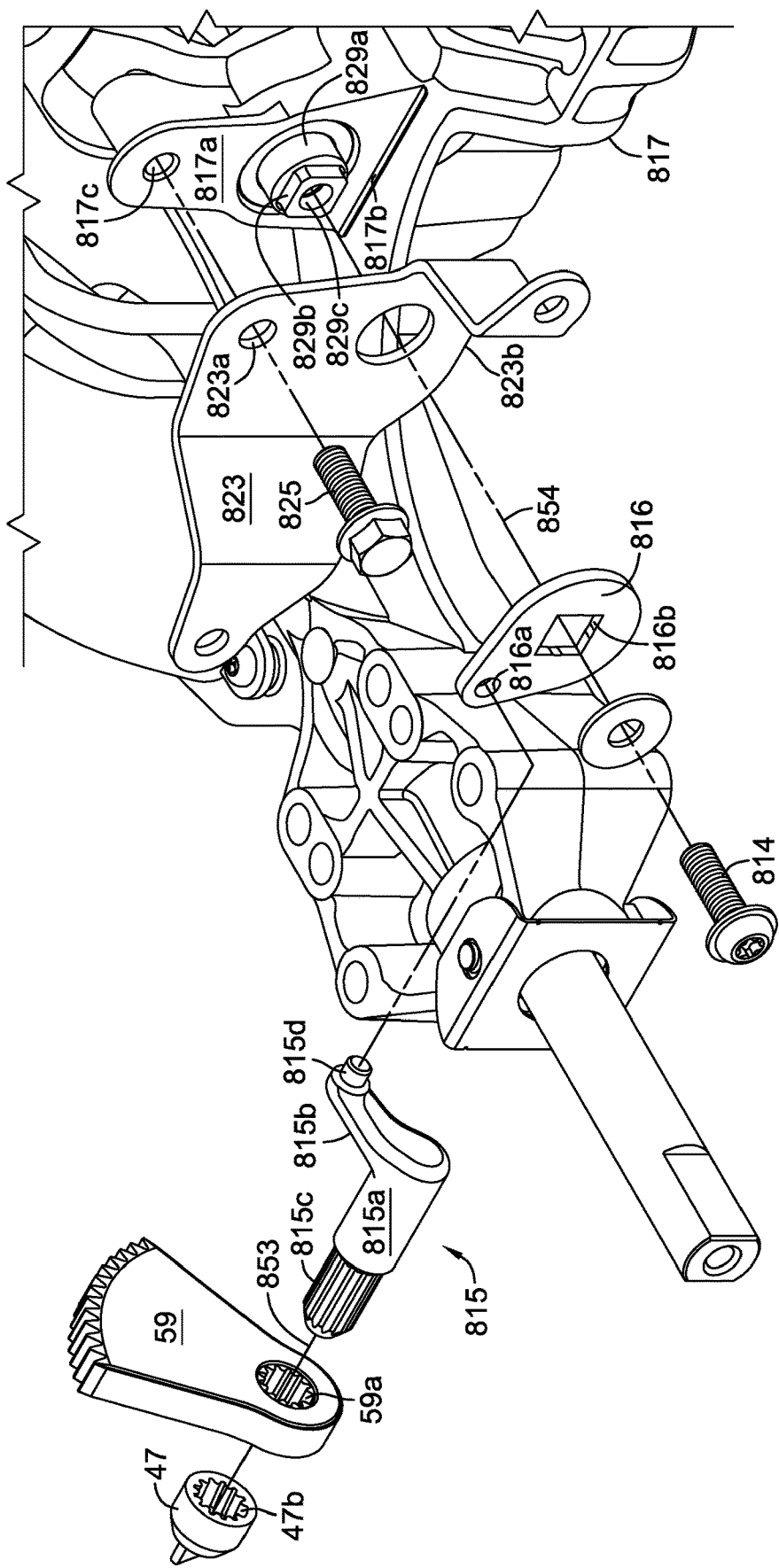
FIG. 6 is an exploded perspective view depicting a portion of the transaxle assembly, electric actuator mounting components, and selected components of the electric actuator shown in FIG. 5.

FIGS. 4-6 depict an actuator 830 in accordance with the teachings herein used with a transaxle 820, which may be similar in function and structure to the transaxle depicted in FIG. 3. The actuators disclosed herein can be used in connection with various drive systems, including hydraulic pumps, transmissions and transaxles, such as is shown in FIG. 3, as well as those taught in the patents referenced above, and commonly-owned U.S. Pat. No. 6,332,393, the disclosure of which is incorporated by reference herein. It is also contemplated, within the scope of this disclosure, that the electric actuator disclosed herein may be applied to other types of variable output drive apparatuses having rotatable control shafts, such as toroidal, friction and mechanical drives. Such drive assemblies are used in conjunction with vehicles and other mobile power equipment.

FIG. 4 depicts a vehicle 890 having a steering wheel 880 to steer a pair of front wheels 886 in a conventional manner. Vehicle 890 incorporates a transaxle 820 driven by a prime mover 891 to drive a pair of rear wheels 893. Transaxle 820 includes an electric actuator 830 that is bracket-mounted to transaxle housing 817, which may also be referred to as a drive housing. Vehicle 890 also includes a controller 870 that receives electrical input signals from various switches, sensors and operator controls, including combination forward/reverse pedal 872. Controller 870, which may be an "EDM" (Electronic Drive Module) model sold by Hydro-Gear, sends electrical power and control signals to electric actuator 830 to control the speed and direction of the output of transaxle 820 and therefore, of vehicle 890.

Figure 7:
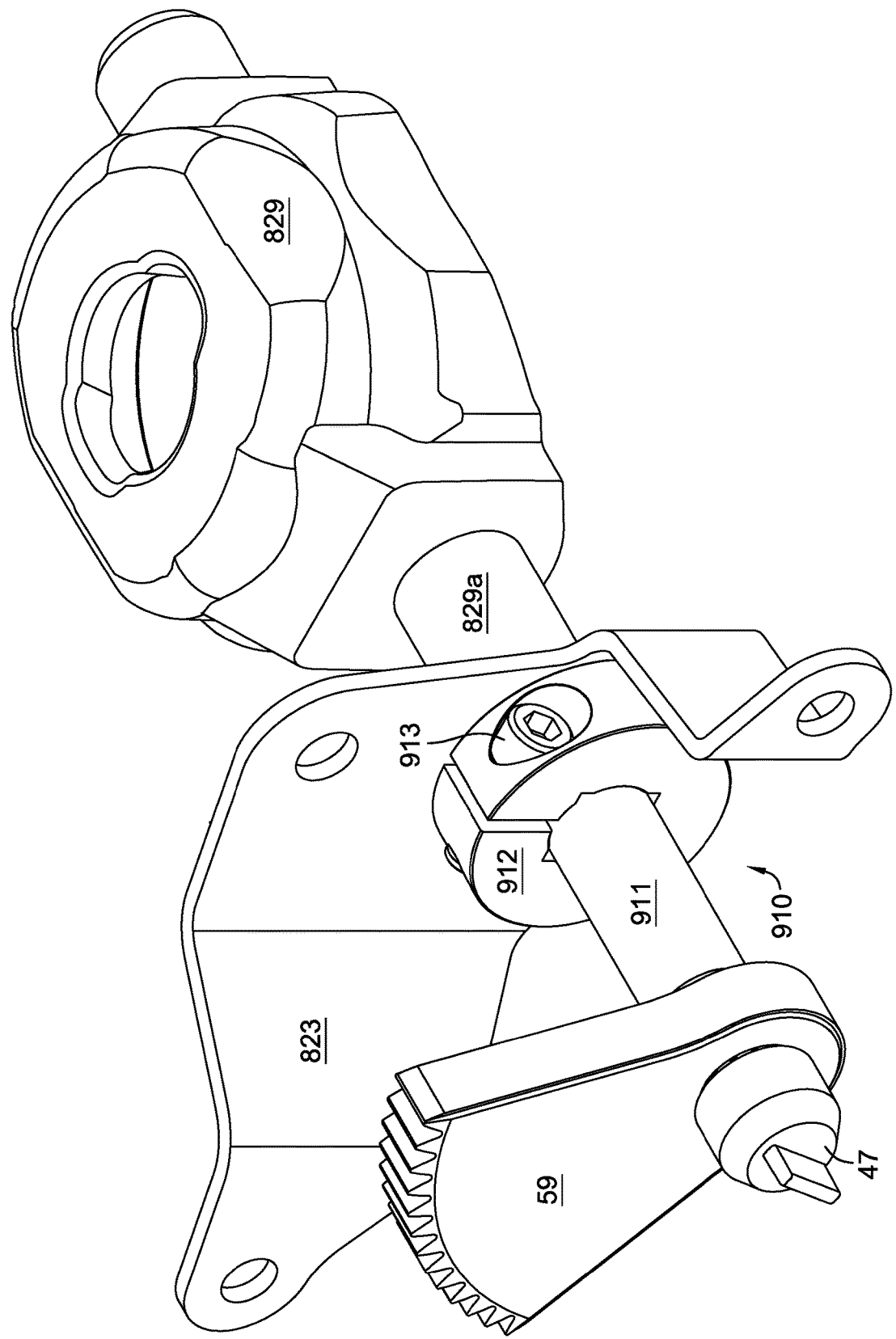
FIG. 7 is a perspective view depicting a swash plate of the transaxle assembly, electric actuator mounting bracket, and selected components of the electric actuator shown in FIG. 6, and an alternate electric actuator output shaft and coupling arrangement.
Figure 8:
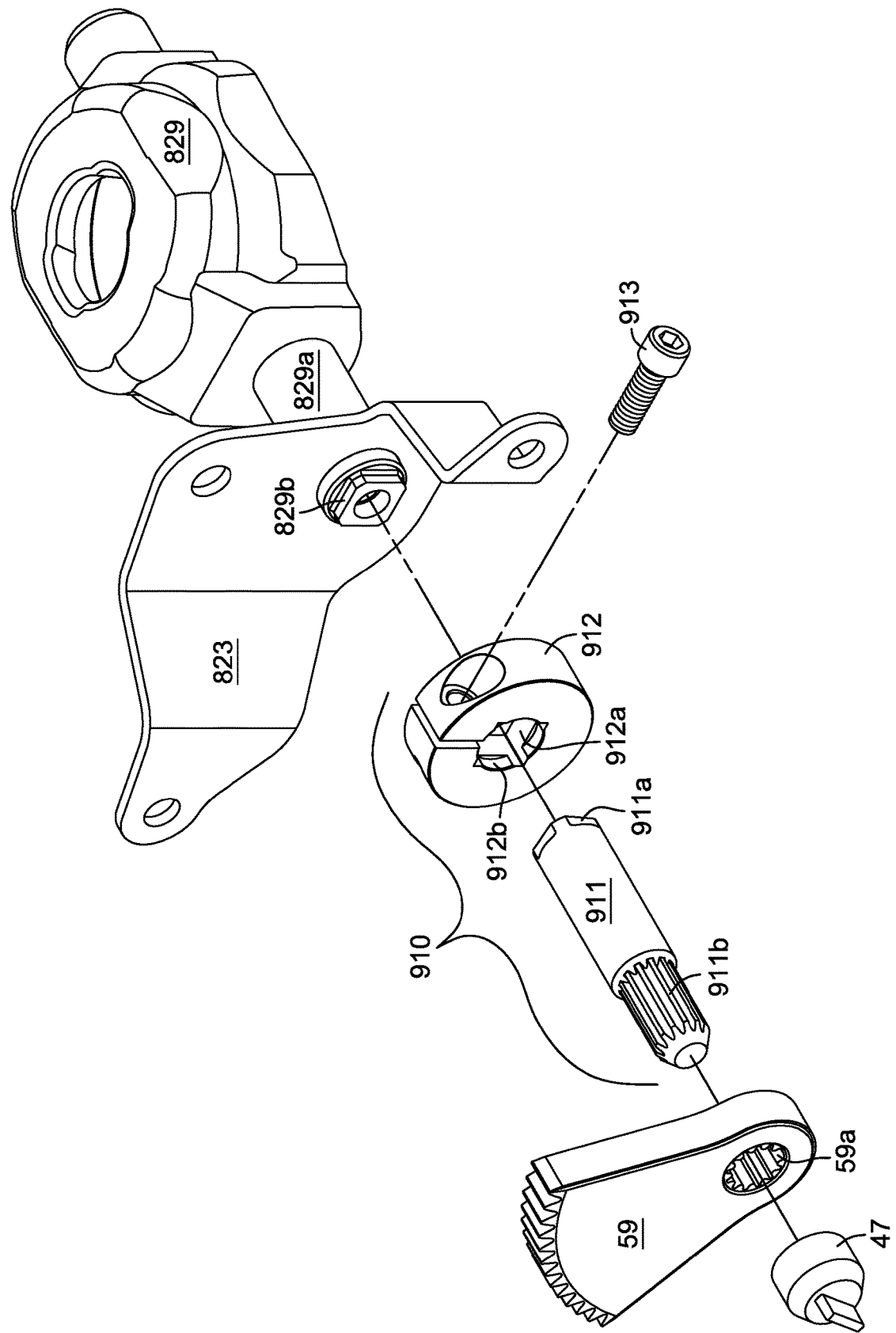
FIG. 8 is a partially exploded perspective view of the components of FIG. 7.

As shown in FIGS. 5 and 6, electric actuator 830 is drivingly engaged to a control shaft 829a of swash plate 829, and control shaft 829a has an axis of rotation 854. Actuator 830 includes an actuator housing 809 which contains various housing components as outlined with regard to actuator 30 discussed above. The internal structure of electric actuator 830 may also be the same as or very similar to that of the actuator 30 discussed above. Swash plate 829, which is structurally and functionally very similar to swash plate 429, is shown most clearly in FIG. 8. FIGS. 7 and 8 illustrate an alternate coupling configuration 910 (which is described herein) that can also interface with the swash plate 829.

Various components are used to operatively connect actuator 830 to control shaft 829a. A mounting bracket 823 is secured to housing 817, and electric actuator 830 is attached to mounting bracket 823 by means of fasteners 824. Mounting bracket 823 mates with a machined planar surface 817a of transaxle housing 817 and is aligned by means of this planar surface 817a, a ledge 817b that is also formed when machining the planar surface 817a, and a threaded bore 817c. Fastener 825 is inserted through opening 823a formed in bracket 823 to engage threaded bore 817c and secure bracket 823 to housing 817. Ledge 817b interfaces with alignment edge 823b of mounting bracket 823 to properly position and restrain the mounting bracket 823. Control arm 816 is mounted on control shaft 829a to rotate therewith.

Electric actuator 830 includes an output arm 815 that permits actuator 830 to be used with various hydraulic drive devices without the need to modify the internal swash plate and/or control shaft of the drive devices. Output arm 815 comprises an output shaft 815a having an axis of rotation 853 and a distal end extending outside of actuator 830. An offset arm 815b is disposed at the distal end of output shaft 815a and extends generally perpendicular to the axis of rotation 853. Output arm 815 further comprises a set of engagement splines 815c formed on the proximal end of output shaft 815a, which is disposed inside actuator 830 and engaged to a sector gear 59, such as discussed above. Proper positioning of output arm 815 is achieved by clocking of engagement splines 815c and complementary splines 59a of sector gear 59, and splines 815c extend through sector gear 59 to engage clocked splines 47b of adaptor 47. Adaptor 47 may be engaged to an angular position sensor 46 as discussed above. An engagement member 815d, in this embodiment shown as round protrusion 815d, is formed on offset arm 815b (and offset from the rotational axis 853 of output arm 815) and engages an opening 816a formed in control arm 816. As shown, a square opening 816b formed about the rotational axis of control arm 816 engages a square protrusion 829b that is formed about the rotational axis 854 of control shaft 829a on its external end. A threaded bore 829c is formed in the external end of control shaft 829a to receive fastener 814 to secure the control arm 816 to the control shaft 829a. The combination of bracket 823 positioning elements, clocking features formed as described on certain actuator components, offset interface of the output arm 815 with the control arm 816, and the square mounting interface between the control arm 816 and the control shaft 829a ensures proper assembly and alignment of electric actuator 830 and swash plate 829 in a hydraulic near-neutral position of transaxle 820. While the rotational axes 853, 854 are collinear in the illustrated embodiment, this is not required. If axes 853, 854 are parallel but non-collinear, for example, then opening 816a in control arm 816 would preferably be formed as an oval or slot to allow for relative movement between the opening 816a and the protrusion 815d resulting from this non-collinearity.

After transaxle 820 is installed in an assembled vehicle 890, neutral is set by first recording in controller 870 the position sensor signal value from electric actuator 830 when transaxle 820 output is providing axle rotation at a specified RPM in a first direction. Then, the position sensor signal value from electric actuator 830 is recorded in controller 870 when transaxle 820 output is providing axle rotation at the same specified RPM in the opposite direction. Finally, the signal value midway between these two recorded signal values is calculated by and stored in the controller 870 as the neutral set value.

FIGS. 7 and 8 illustrate an alternate coupling configuration 910 for a slightly modified electric actuator 830 to connect the modified actuator 830 to the control shaft 829a of swash plate 829. For sake of clarity, the actuator housing 809 and drive housing 817 are not depicted in these figures, but the reader will understand that this embodiment can be used with those structures as depicted previously. Sector gear 59 depicted in FIGS. 7 and 8 is disposed inside the actuator housing 809.

This alternate coupling configuration 910 is a directly coupled, in-line arrangement that does not include an actuator output arm or a control arm. Rather, an actuator output shaft 911 replaces actuator output arm 815, and output shaft 911 is connected to the control shaft 829a by a clamping coupler 912 and a screw 913. An assembler of this alternate configuration must ensure that swash plate 829 and output shaft 911 of the modified actuator are aligned in their respective near-neutral orientations. Output shaft 911 includes a square protrusion 911a on its external end disposed outside actuator housing 809 and clocked splines 911b on the internal end disposed inside actuator housing 809. Clocked splines 911b can be of the same form as clocked splines 815c to engage with clocked splines 59a and clocked splines 47b described previously herein. The clamping coupler 912 includes a centrally located square opening 912a to receive both square protrusion 911a and square protrusion 829b to facilitate alignment of output shaft 911 with swash plate 829. Rounded clamping surfaces 912b are formed on both sides of coupler 912 adjacent to each coupled component to receive and apply clamping pressure to the coupled components (output shaft 911 and control shaft 829a) when screw 913 is properly torqued. The modified actuator 830 is mounted in the same manner that the unmodified actuator 830 is mounted on bracket 823, and bracket 823 is attached to housing 817 with fastener 825 as shown in FIG. 5. Coupler 912 is disposed on the same side of bracket 823 as is the modified actuator 830.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive control assembly for use in connection with a variable output drive apparatus, comprising:
    a hydraulic control mechanism disposed in a drive housing;
    a control shaft comprising a proximal end engaged to the hydraulic control mechanism and a distal end extending out of the drive housing;
    an actuator disposed external to the drive housing, the actuator comprising an actuator housing and a gear disposed in the actuator housing;
    an output shaft comprising a first end disposed in the actuator housing and operatively connected to the gear and a second end disposed external to the actuator housing;
    a bracket disposed external to both the drive housing and the actuator housing and shaped to mount the actuator housing to the drive housing; and
    a clamping coupler disposed on one side of the bracket and shaped to receive the distal end of the control shaft and the second end of the output shaft to align and operatively connect the output shaft to the control shaft.

2. The drive control assembly of claim 1, wherein the hydraulic control mechanism comprises a swash plate capable of engaging a plurality of pump pistons, and the actuator further comprises an electric motor disposed in the actuator housing and engaged to and driving the gear.

3. The drive control assembly of claim 1, further comprising a screw engaged to the clamping coupler for adjusting a clamping pressure to be applied to the control shaft and the output shaft.

4. The drive control assembly of claim 1, wherein the second end of the output shaft has a first protrusion formed thereon, and the distal end of the control shaft has a second protrusion formed thereon, and the clamping coupler comprises a centrally located opening having a first connecting portion on one side to engage the first protrusion and a second connecting portion on a second side thereof to engage the second protrusion.

5. The drive control assembly of claim 4, wherein the clamping coupler further comprises a first rounded clamping surface inside the centrally located opening to engage the output shaft, and a second rounded clamping surface inside the centrally located opening to engage the control shaft.

6. The drive control assembly of claim 5, further comprising a screw engaged to the clamping coupler for adjusting a clamping pressure to be applied to the control shaft and the output shaft.

7. The drive control assembly of claim 6, wherein the hydraulic control mechanism comprises a swash plate capable of engaging a plurality of pump pistons.

8. The drive control assembly of claim 7, wherein the actuator further comprises an electric motor disposed in the actuator housing and engaged to and driving the gear.

9. The drive control assembly of claim 1, wherein the gear comprises a sector gear.

10. A drive control assembly for use in connection with a variable output drive apparatus, comprising:
    a control mechanism disposed in a drive housing and being capable of adjusting an output of the variable output drive apparatus;
    a control shaft comprising a proximal end engaged to the control mechanism and a distal end extending out of the drive housing;
    an actuator disposed external to the drive housing, the actuator comprising an actuator housing and a gear disposed in the actuator housing;
    an output shaft comprising a first end disposed in the actuator housing and operatively connected to the gear and a second end disposed external to the actuator housing; and
    a clamping coupler shaped to receive the distal end of the control shaft and the second end of the output shaft to align and operatively connect the output shaft to the control shaft.

11. The drive control assembly of claim 10, further comprising a bracket disposed external to both the drive housing and the actuator housing and shaped to mount the actuator housing to the drive housing, wherein the control shaft extends through an opening in the bracket.

12. The drive control assembly of claim 11, wherein the clamping coupler is disposed external to both the drive housing and the actuator housing, and is located adjacent to the bracket.

13. The drive control assembly of claim 10, wherein the second end of the output shaft has a first square protrusion formed thereon, and the distal end of the control shaft has a second square protrusion formed thereon, and the clamping coupler comprises a centrally located square opening to engage the first square protrusion and the second square protrusion.

14. The drive control assembly of claim 13, wherein the clamping coupler further comprises a first rounded clamping surface on a first side of the clamping coupler to engage the output shaft, and a second rounded clamping surface on a second side of the clamping coupler opposite the first side to engage the control shaft.

15. The drive control assembly of claim 14, further comprising a screw engaged to the clamping coupler for adjusting a clamping pressure to be applied to the control shaft and the output shaft.

16. A drive control assembly for use in connection with a variable hydraulic drive apparatus disposed in a drive housing and including a swash plate capable of engaging a plurality of pump pistons, the drive control assembly comprising:

an actuator disposed external to the drive housing, the actuator comprising an actuator housing and a gear disposed in the actuator housing;

an output shaft comprising a first end disposed in the actuator housing and operatively connected to the gear, a second end disposed external to the actuator housing and a first connector formed on the second end of the output shaft;

a control shaft comprising a proximal end engaged to the swash plate, a distal end extending out of the drive housing, and a second connector formed on the distal end of the control shaft;

a clamping coupler comprising a centrally located opening having a first portion on one side shaped to engage the first connector and a second portion on a second side thereof and shaped to engage the second connector to align and operatively connect the output shaft to the control shaft.

17. The drive control assembly of claim 16, wherein the clamping coupler further comprises a first rounded clamping surface inside the centrally located opening to engage the output shaft, and a second rounded clamping surface inside the centrally located opening to engage the control shaft.

18. The drive control assembly of claim 16, further comprising a bracket disposed external to both the drive housing and the actuator housing and shaped to mount the actuator housing to the drive housing, wherein the control shaft extends through an opening in the bracket.

19. The drive control assembly of claim 18, wherein the clamping coupler is disposed external to both the drive housing and the actuator housing, and is located adjacent to the bracket.

20. The drive control assembly of claim 16, wherein the second end of the output shaft has a first square protrusion formed thereon, and the distal end of the control shaft has a second square protrusion formed thereon, and the clamping coupler comprises a centrally located square opening to engage the first square protrusion and the second square protrusion.

* * * * *